United States Patent

[11] 3,595,392

| [72] | Inventor | Arthur L. Markel<br>Miami, Fla. |
|---|---|---|
| [21] | Appl. No. | 833,105 |
| [22] | Filed | June 13, 1969 |
| [45] | Patented | July 27, 1971 |
| [73] | Assignee | Reynolds Submarine Services Corporation<br>Miami, Fla. |

[54] METHOD OF AND APPARATUS FOR SEPARATING FLUIDS HAVING DIFFERENT DENSITIES
30 Claims, 23 Drawing Figs.

[52] U.S. Cl............................................. 210/73,
 210/84, 210/242, 210/251, 210/416, 210/DIG. 21
[51] Int. Cl..................................................... E02b 15/04,
 B01d 17/00
[50] Field of Search........................................ 210/73, 83,
 84, 94, 93, 242, DIG. 21, 251; 61/1

[56] References Cited
UNITED STATES PATENTS

| 1,406,950 | 2/1922 | Fackert | 210/83 |
|---|---|---|---|
| 2,330,508 | 9/1943 | McColl | 210/242 |
| 2,346,009 | 4/1944 | Bryson | 210/73 |
| 2,876,903 | 3/1959 | Lee | 210/242 |
| 3,277,926 | 10/1966 | Skardal | 138/46 |
| 3,476,246 | 11/1969 | Dahan | 210/242 X |
| 3,396,511 | 8/1968 | Fracke et al. | 55/83 |
| 3,508,652 | 4/1970 | Wooley | 210/76 |

*Primary Examiner*—Samih N. Zaharna
*Attorney*—Low & Matthews

ABSTRACT: A method of and apparatus for separating fluids having different densities utilizing an axial flow pump which achieves vortex separation without emulsification of the fluids. A Pitot tube positioned downstream from the axial flow pump separates substantially all of a lighter density fluid from the discharge of the axial flow pump and delivers the fluid to a settling tank where gravity separation of the different density fluids is achieved very rapidly because of the absence of emulsification. A heavier density fluid which bypasses the Pitot tube is used to provide propulsion for a collecting unit. The fluids to be separated are contained by means of a floating boom attached to the collecting unit. The latter is provided with a weir or floating skimmer means which facilitates the delivery of the fluids to be separated to the axial flow pump.

INVENTOR

Arthur L. Markel

By *Rowe & Matthews*

ATTORNEYS

INVENTOR
Arthur L. Markel

BY
*Ross & Matthews*
ATTORNEYS

PATENTED JUL 27 1971 3,595,392

INVENTOR
Arthur L. Markel

BY *Rose & Matthews*

ATTORNEYS

METHOD OF AND APPARATUS FOR SEPARATING FLUIDS HAVING DIFFERENT DENSITIES

This invention relates to a method of and apparatus for separating fluids having different densities, and more particularly, to such a method and apparatus wherein vortex separation is accomplished with the aid of an axial flow pump.

Heretofore, it has been common to pump fluids to be separated, such as oil and water, through a positive displacement or centrifugal pump. This has resulted in emulsification of the fluids, such as an emulsion of water and oil, which requires hours in huge settling tanks in order to achieve separation of the fluids. Furthermore, a positive displacement or centrifugal pump is relatively easily clogged by debris which further prolongs the operation.

In accordance with the present invention, the foregoing shortcomings and disadvantages of the prior art are effectively overcome by utilizing an axial flow pump provided with an axial flow impeller which not only avoids the clogging problems of the prior art, but, more importantly, achieves separation of fluids of different densities in a matter of minutes. Moreover, when the invention is practiced in accordance with one form of the invention, the fluids are divided into primary and secondary flow paths with the primary flow path providing propulsion for the marine vessel used as the collecting unit.

The invention is applicable to a great variety of fluids with separation being possible, for example, when one fluid has a density of up to 95 percent of the other fluid. The axial flow pump preferably has a variable speed whereby the delivery of fluid in the secondary flow to an extractor tube, such as a Pitot tube, may be maintained substantially constant.

As a special feature of the present invention, the pivot tube used to extract or cull out the secondary flow is provided with means to vary the effective diameter thereof whereby a great many flow speeds and concentrations are possible for the secondary flow.

As a further special feature, the Pitot tube is positioned within a sightglass or sight tube whereby the Pitot tube may be axially aligned with the concentrated lighter density fluid. Where oil and water are being separated, for example, the concentrated oil flow is quite pronounced which makes it a relatively easy matter to position the Pitot tube for greater efficiency. A negative pressure applied to the Pitot tube allows a wide range of flow control.

In the practice of the present invention is is convenient to contain the contaminant, such as oil, in the water by means of a floating boom which is used to encircle an oil slick, for example. The collecting unit, which may be a tug or the like, has the floating boom attached to it. The collecting unit also carries a skimmer-weir which comprises a hinged door member or weir the front edge of which is suitably controlled to determine the input to the axial flow pump.

Dependent upon the desired flow characteristics, the downstream conduit may be made to converge or diverge. As a further modification, the section of the conduit which houses the axial flow pump itself may be made to converge or diverge.

The inherent advantages and improvements of the present invention will become more readily apparent upon considering the following detailed description of the invention and by reference to the drawings in which:

Figures 1, 2:
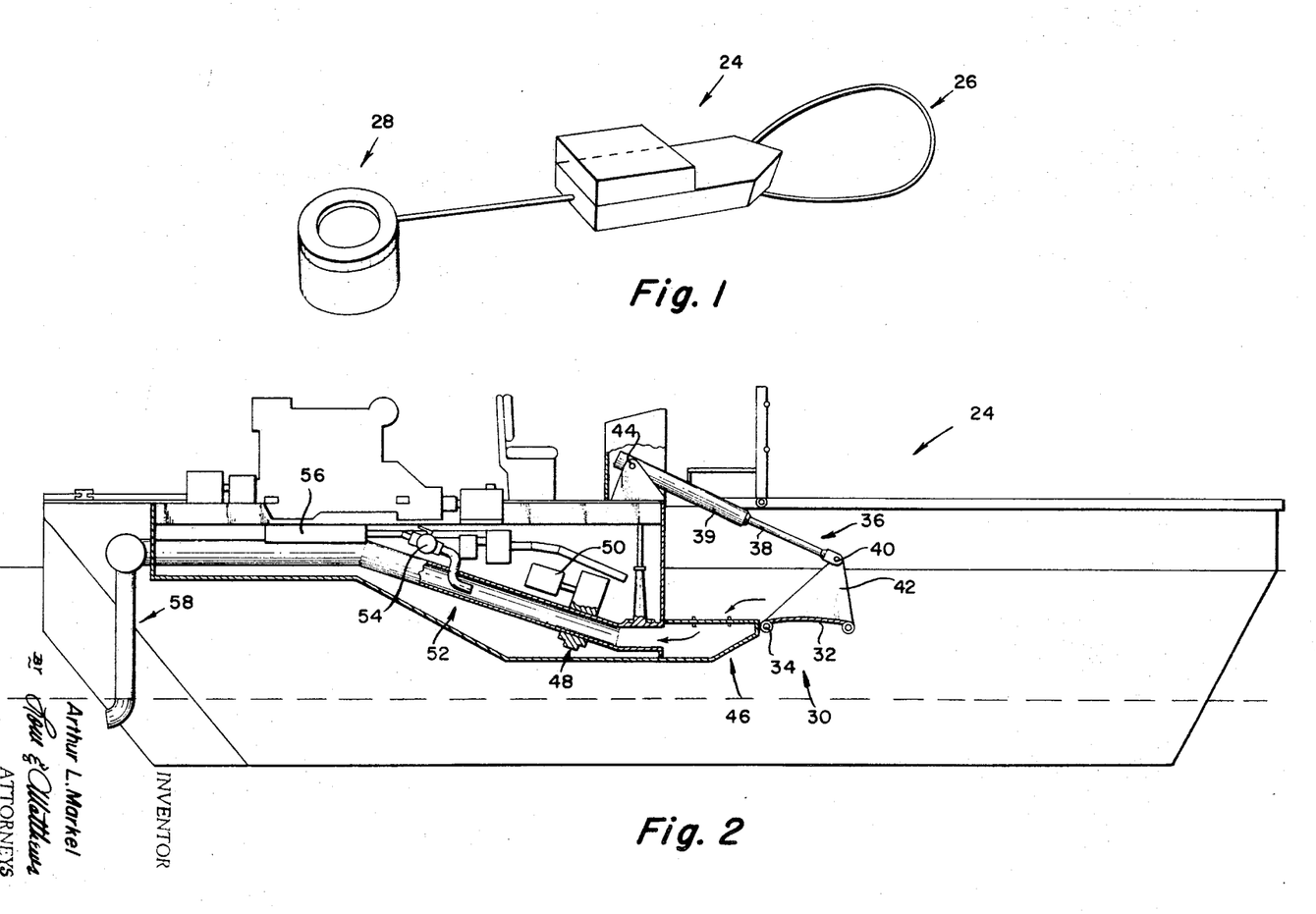
FIG. 1 is a schematic representation of one means of collecting different density fluids to be separated in accordance with the present invention.
FIG. 2 is a side elevational view of a portion of the collecting unit illustrated in FIG. 1.

Referring now to FIG. 1 of the drawings, there is illustrated a floating collecting unit indicated generally at 24 which may comprise an aluminum barge. At the front of the collecting unit 24 there is illustrated a floating boom means indicated generally at 26. The purpose of the floating boom means 26 is to provide local containment for the fluids to be separated at the surface of a body of water. For example, a boom 26 may be placed in encircling relationship with respect to an oil slick or the like. A storage means 28 is positioned near at hand to the collecting unit 24 and for purposes of this invention storage means 28 may take any suitable form.

Referring now to FIG. 2, the floating collecting unit 24 is illustrated in greater detail. Thus there is shown a weir means indicated generally at 30 which comprises a door member or weir 32 which is hinged at 34. Means are provided for raising door member 32 as indicated generally by numeral 36. Typical of such means is a rod 38 of a hydraulic cylinder 39 one end of which is attached at 40 to a side plate member 42 and the other end is attached at 44 to the collector unit 24.

A conduit means is indicated generally at 46 for conveying fluid which passes over the door member or weir 32 of the weir means 30 and is delivered to an axial flow pump indicated generally at 48. An engine 50 may be used to drive the axial flow pump 48. For purposes of this invention, the axial flow pump may be driven mechanically, hydraulically or electrically. The output or discharge of the axial flow pump 48 is such that vortex separation of fluids of different densities occurs so that Pitot tube means or extractor tube means indicated generally at 52 are positioned in the discharge path of the axial flow pump 48. The Pitot tube means 52 is controlled by a suitable valve control indicated generally at 54 for delivery to one or more settling tanks such as one shown at 56. Numeral 58 indicates a propulsion directing means for the collecting unit 24 which will be described in greater detail hereinafter.

Figure 3:
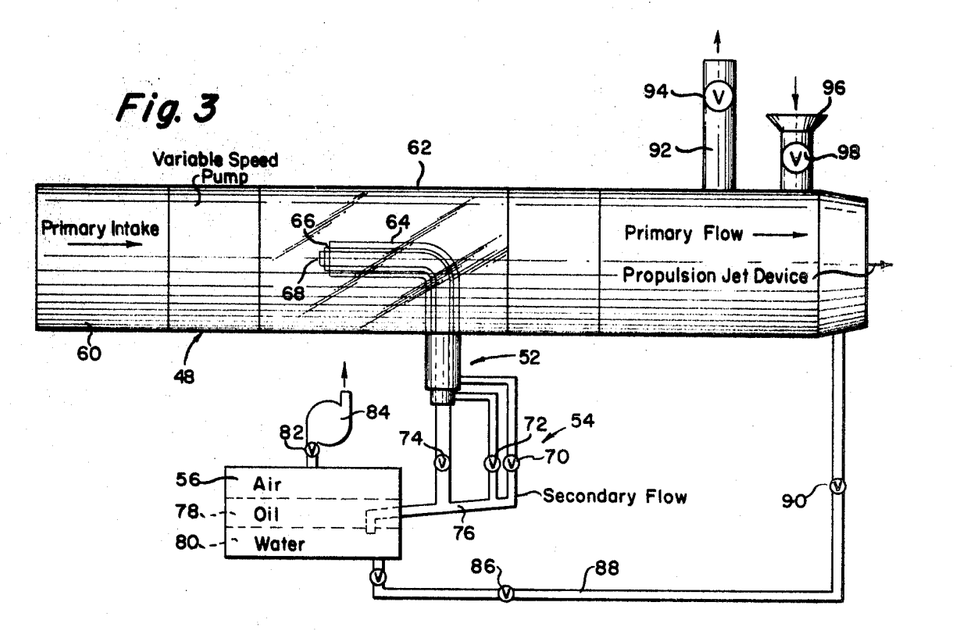
FIG. 3 is a schematic view in side elevation illustrating the general arrangement of the separating means of the present invention.

Referring now to FIG. 3 of the drawings there is illustrated more specifically the manner in which separation of the fluids into primary and secondary flow paths is obtained. Thus there is shown a primary intake 60 to the axial flow pump 48. Downstream thereof a Pitot tube means 52 is positioned. In the preferred form of the invention, the Pitot tube means 52 is provided with means for changing its effective diameter such as by the provision of concentric tubes 64, 66 and 68 which are opened or closed by means of associated valves 70, 72 and 74. These valves may be simply controlled by a single control lever or switch, if desired, whereby an operator may very quickly change from one effective diameter condition for the Pitot tube 52 to another in order to compensate for different flow conditions within the exhaust from axial flow pump 48. The output of the Pitot tube under the control of valves 70, 72 and 74 is delivered to conduit 76 into one or more settling tanks 56 wherein in a typical application oil 78 and water 80 are Separated by gravity. Because of the fact that the fluid emerging from the axial flow pump 48 has not been emulsified, the fluids of different density, such as oil and water 78 and 80, may be separated in separating tank 56 in a very short period of time such as in about one or two minutes. A valve 82 controls a variable speed air exhaust vacuum pump 84 for purposes of establishing a vacuum in the separating tank 56. The secondary flow into Pitot tube 52 is increased or decreased by the amount of vacuum in tank 56.

It is desired to have means to remove the separated water from the settling or collecting tank 56. This is accomplished by a valve 86 in conduit 88 and optionally may also include a variable speed pump 90 in series with the conduit 88 in order to return the high-density fluid, such as water, which has been separated from the low density fluid, such as oil, to the primary flow.

If desired, and as an optional feature, a conduit 92 is taken from the primary flow downstream from the Pitot tube and may be led to an auxiliary jet manifold. Also as an optional feature, a chemical dispersant intake may be provided at 96 under control of valve 98 downstream from the separation of fluids into primary and secondary flows. Also, if desired, and as an optional feature, there may be straightening vanes downstream from the Pitot tube 52 in order to assure laminar flow in the primary flow from axial flow pump 48.

Figures 4, 5:
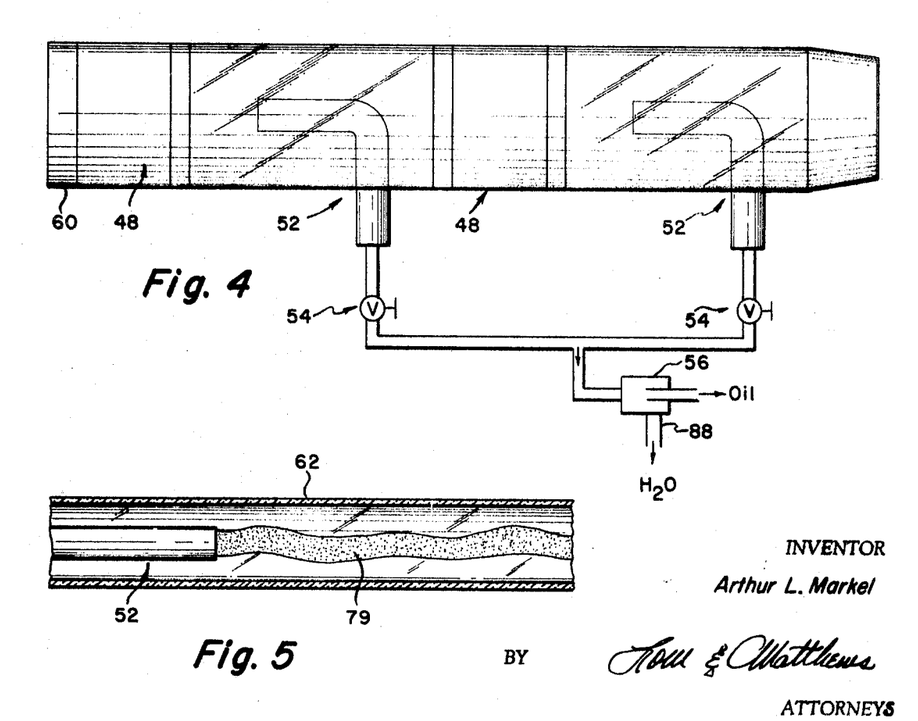
FIG. 4 is a schematic view similar to FIG. 3 showing an alternate arrangement of the separating means for use in connection with the present invention.
FIG. 5 is a fragmentary view in vertical cross section illustrating a sight tube to be used in connection with the present invention.
Figure 6:
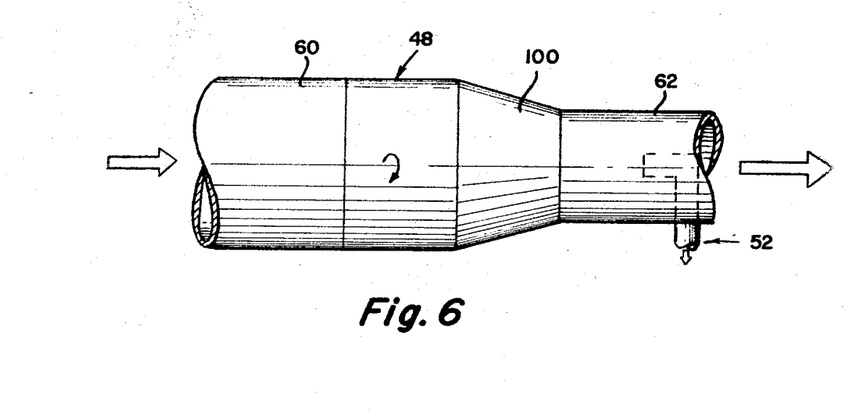
FIG. 6 is a schematic front elevational view illustrating a converging downstream conduit section.

As a special feature of the present invention, a section of the conduit immediately prior to the position of the Pitot tube 52 but which also contains the Pitot tube is made into a sightglass or sight tube 62. This greatly facilitates separation by sight of a darkened oil rich concentrate 79 or other low-density fluid from the exhaust of the axial flow pump 48 by the Pitot tube 52 which may be axially aligned therewith. For example, one suitable material for the sightglass or sight tube 62 is methyl methacrylate (Plexiglas).

Figure 7:
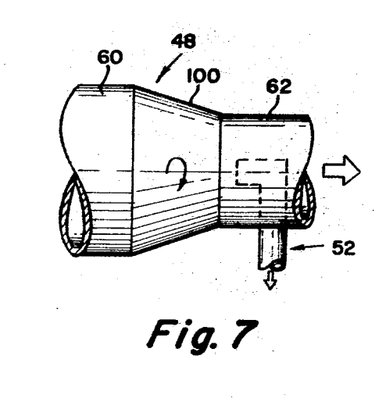
FIG. 7 is a view similar to FIG. 6 wherein the axial flow pump is mounted within the converging conduit section.
Figure 8:
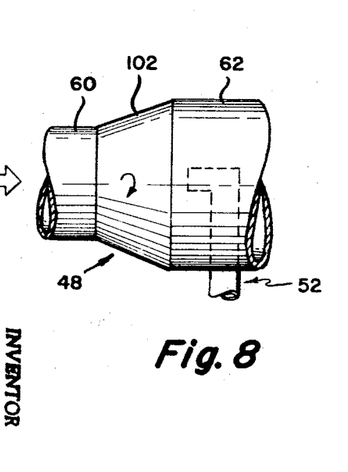
FIG. 8 is a front elevational view similar to FIG. 7 but showing a diverging conduit section for the axial flow pump mounting.
Figure 9:
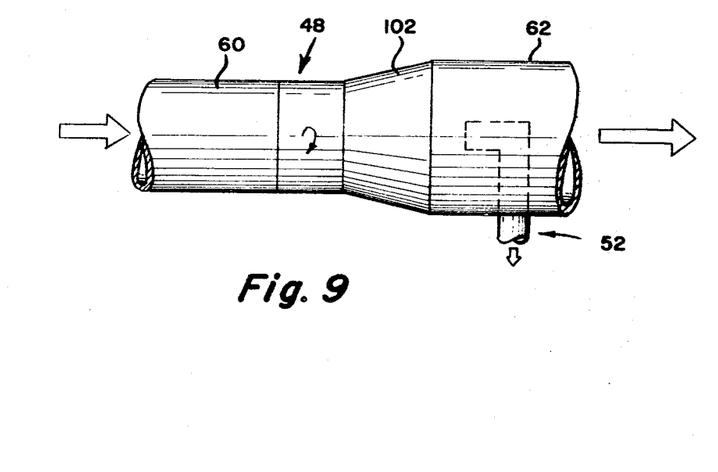
FIG. 9 is a front elevational view similar to FIG. 6 but showing a divergent downstream conduit section for use in accordance with the present invention.

Referring now to FIGS. 6—9, there is illustrated various combinations for the construction of the conduit means downstream from the axial flow pump 48. Thus in FIG. 6 there is illustrated a converging diameter condition 100 downstream from the axial flow pump 48. In FIG. 7 the axial flow pump 48 is mounted within the converging section. FIGS. 8 and 9 show diverging downstream conditions. In FIG. 8 the axial flow pump itself is located in the diverging section of the conduit whereas in FIG. 9 the exhaust or discharge from the axial flow pump leads directly into the diverging section 102.

Figure 10:
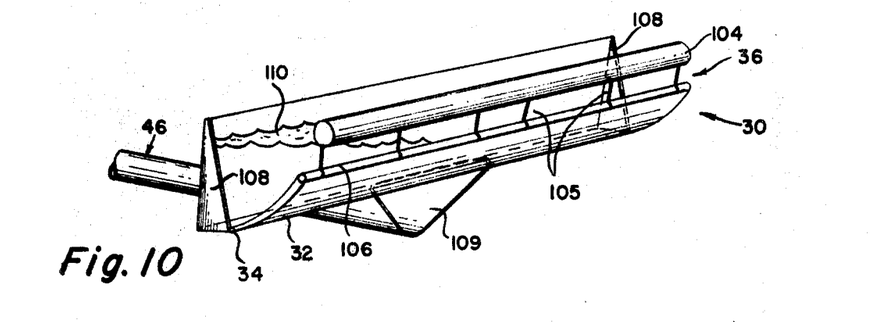
FIG. 10 is a perspective view illustrating one form of floating skimmer-weir arrangement for use in connection with the present invention.

One form of a weir means 30 is illustrated in FIG. 10. A floating rod 104 attached to the rounded front edge 106 of weir 32 by rods or wires 105 constitutes one means 36 for adjusting the elevation of the leading edge of weir 32 with respect to the surface of water 110. A splash shield or side plate members are shown at 108. The ends of the weir means 30 may be closed by a catamarran hull on either side or by metal curtains attached to each splash shield 108. A funnel 109 directs the fluids which pass over the leading edge 106 of weir 32 to the axial flow pump by means of conduit 46. A suitable drive is schematically indicated at 121 communicated through a coupling member 123 to the axial flow pump 48 in FIG. 12.

The weir 32 is preferably hollow or plastic foam filled and the floating rod 104 is also either hollow or plastic foamed filled. In practice, the rounded front edge 106 is longitudinally located at the center of buoyancy of the vessel such as is illustrated in FIGS. 11 and 12.

Figures 11, 12, 13:
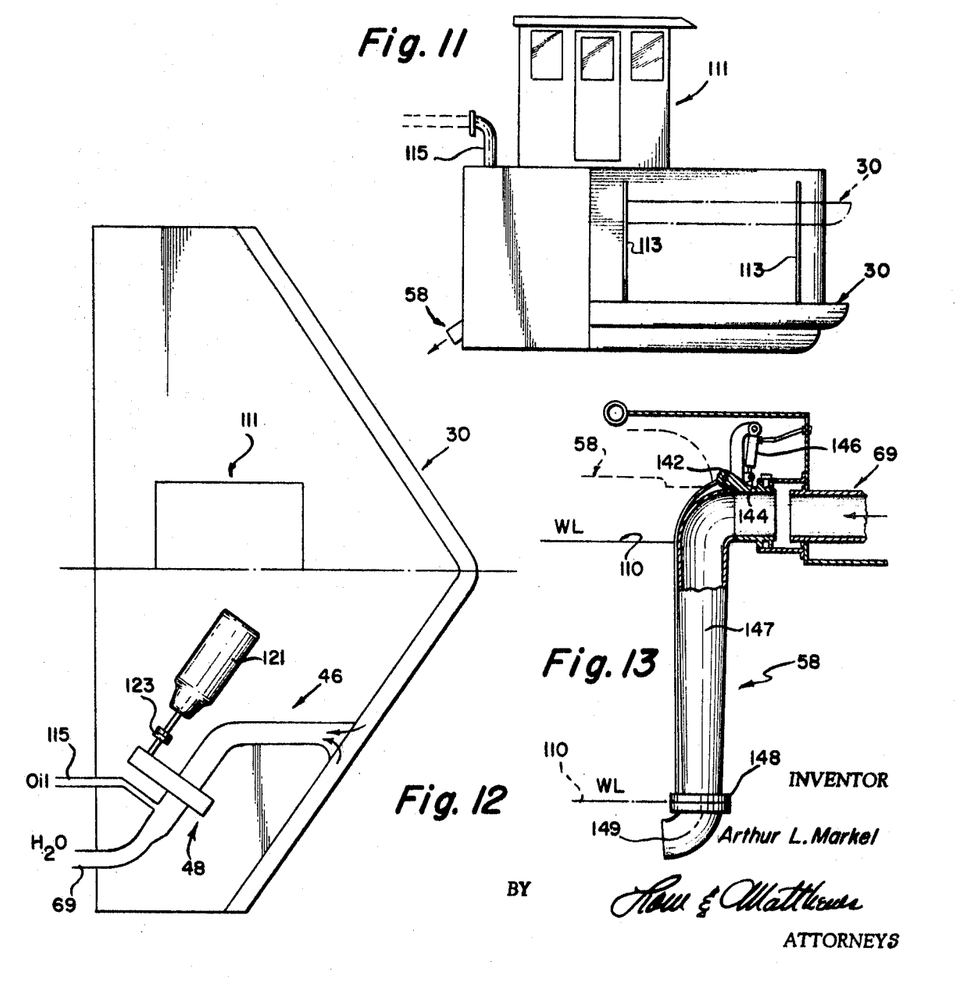
FIG. 11 is a side elevational view illustrating the vertical adjustment of the skimmer-weir means attached to a collecting unit.
FIG. 12 is a top plan view of the collecting unit illustrated in FIG. 11 with parts broken away in order to indicate delivery of the fluids to the axial flow pump.
FIG. 13 is a side elevational view illustrating two positions of the exhaust propulsion tube.

Reference to FIGS. 11 and 12 schematically indicate the collecting marine vessel with its pilot house 111 and vertical track members or runners 113 by means of which the complete weir means 30 is vertically adjustable. A vernier type adjustment for the leading edge 106 of the weir or door member 32 is possible by varying either or both of the buoyancy of floating rod 104 and the length of rods or wires 105.

The delivery of the primary flow from the axial flow pump is indicated by conduit 69 in FIG. 13 to a propulsion directing means indicated generally at 58. This means includes a main pivotal tubular section 147 which carries by means of connector 148 a swivel bottom tubular member which may be rotated through 360°. The entire propulsion directing means 58 may be pivoted as indicated in phantom in FIG. 13 about pivot point 142 by means of hydraulic cylinder 146 acting through link 144 which is connected to the pivotal tubular section 147. In this manner directional propulsion may be imparted to the marine collecting vessel when and if desired.

Figure 14:
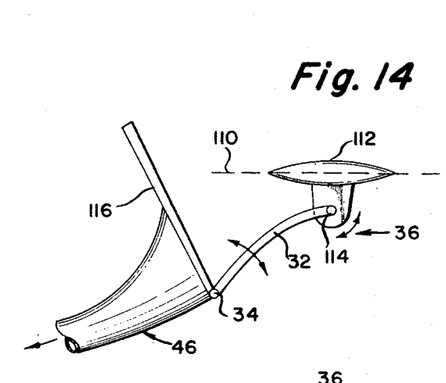
FIGS. 14—19 are all fragmentary side elevational views illustrating various skimmer-weir arrangements.
Figures 15, 16, 18, 19:
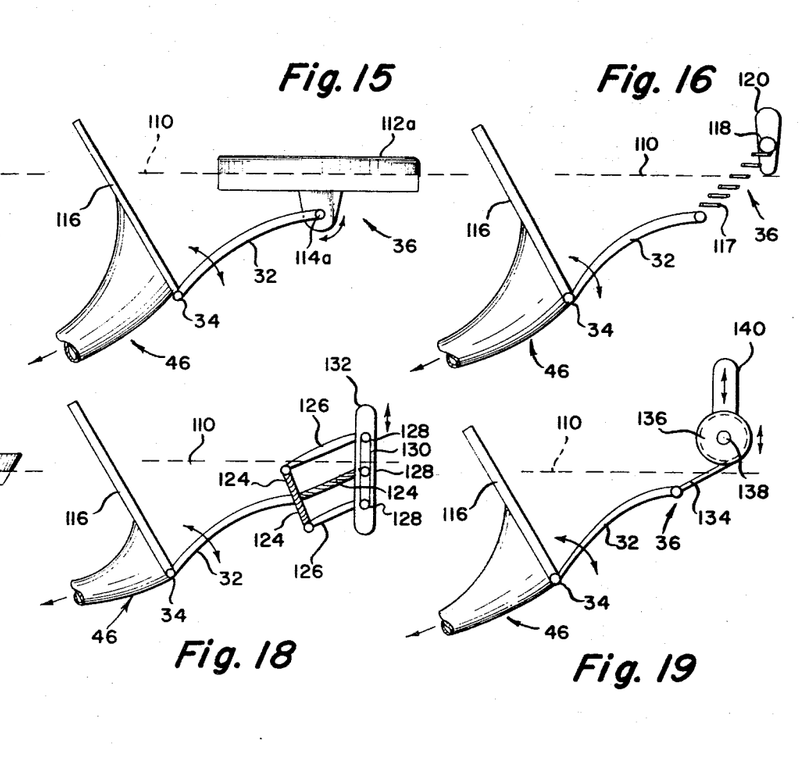

Referring now to FIGS. 14—19, inclusive, there are shown various weir means for introducing the fluid to be separated into a conduit 46 to be passed through the axial flow pump 48. In FIGS. 14 and 15, with the water line being illustrated at 110, the door member or weir 32 is illustrated to be hinged at its rear edge 34 with the front edge thereof being supported by a floating member 112 in FIG. 14 and at 112a in FIG. 15. Float member 112 is attached to the leading edge of weir 32 at 114 and float member 112 is attached to the leading edge of weir 32 at 114a. A support member 116 attaches the skimmer-weir to the collecting unit and supports the conduit means 46.

In FIG. 16 the weir 32 is again hinged at 34 and in this instance an elastic cord 117 is connected between the front edge of the weir 32 and a rod 118 which is received within a slot 120 attached to the collecting unit.

Figure 17:
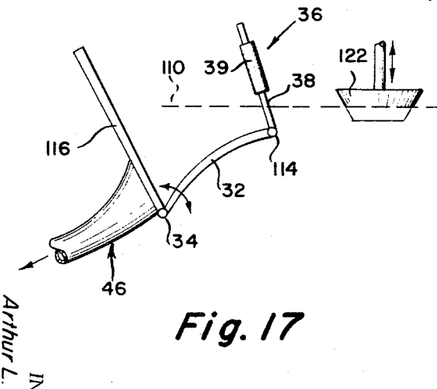
Figures 20, 21, 22, 23:
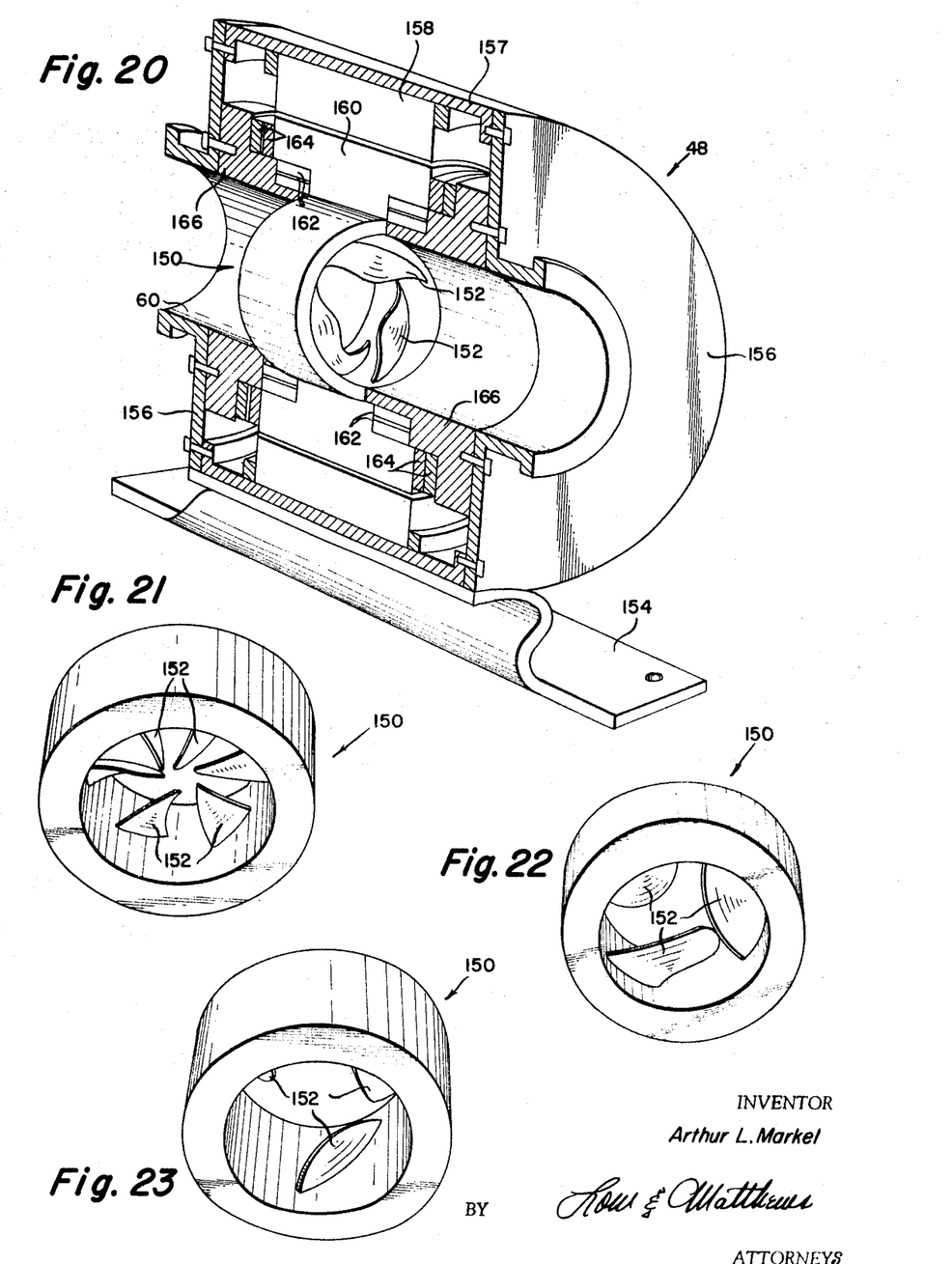
FIG. 20 is a perspective view, partially in vertical cross section, illustrating the mounting for the axial flow pump.
FIGS. 21—23 illustrate various configurations in perspective view for the impeller of the axial flow pump.

In similar fashion, in FIG. 17 the weir 32 again being pivoted at 34 has its front edge attached to the rod 38 of a hydraulic cylinder 39 thereby constituting the means 36 of raising the door member or weir 32, and constitutes a modification of the FIG. 2 illustration. Actuation of the hydraulic cylinder 39 in FIG. 17 is under the control of a sensor float 122 which is shown schematically as a means for providing an automatic hydraulic followup system for the control of the height of the leading edge 114 of weir 32.

In FIG. 18, the door member or weir 32 is again pivoted at the rear edge thereof at 34 and has three elastic cords or spring tension cable members 124 attached to the leading edge thereof. Two of these elastic cords or spring tension cables are attached to substantially parallel arms 126 the other ends of which are attached to cross rods 128. The latter are connected together in substantially parallelogram fashion to a traveling block 130 which slides vertically in slot 132 which is fixed to the collecting unit. The central elastic cord or spring tension cable 124 is attached directly to a centrally located rod 128 vertically reciprocable within slot 132.

In FIG. 19 the door member or weir 32 is attached at 34 at the trailing edge thereof and the leading edge has a cable or rope 134 attached thereto which is entrained about a pulley 136 whose axle 138 reciprocates vertically in a slot 140 in a member attached to the collector unit.

Referring now to FIGS. 20—23, a suitable mounting structure for the axial flow pump 48 is indicated. Positioned central of the axial flow pump is an impeller 150 having vanes or blades 152. The pump itself is provided with a mounting plate 154 whereby it may be attached to the structure of the collecting unit. A pump 48 is provided with a pair of end cover plates 156 which are secured to a stator casing 157 by bolts or the like. A stator of field winding for the pump is indicated at 158 within which a rotor 160 rotates. The rotor 160 may be driven mechanically by a gear or electrically or hydraulically for purposes of the present invention. Rotary bearings are provided at 162 and thrust bearings at 164. It has been found that a greater life for the pump is provided by making the rotary bearings 162 and thrust bearings 164 from ceramic alumina. Backup bearing members 166 are attached by bolts or the like to the end cover plates 156 and support the rotary bearings 162 and thrust bearings 164.

In operation, the barge 24 will be launched in the vicinity of the fluids to be collected such as an oil slick and it can be towed or travel under its own water-jet power to the site. During this phase conventional holding tanks on the barge are empty thus providing light draft. An auxiliary work boat pulls the oil boom 26 around the slick, industrial waste discharge, or other multidensity fluid mixture and the boom is attached to the barge. The barge is placed in operating heavy draft by opening conventional intake valves (not shown) and the diesel engine and hydraulic system are put in operation. Power is applied to the axial flow pump 48 and water is pumped out of the forward holding tank. The axial flow pump is started and the weir means 30 is adjusted to the thickness of oil in the oil slick, fir example, and to the pump primary flow. The primary and concentrate flow are individually adjustable to accommodate thick or thin layers of oil. As the oil is removed, the dimensions of the boom are adjusted to ensure that the oil slick is concentrated near the barge. As the oil and water mixture passes through the axial flow pump 48, with the aid of a sight tube or sightglass 62 the heavy concentration 79 of the oil rich mixture can be observed and the Pitot tube 52 axially adjusted to be in alignment therewith. Thus the discharge from variable speed pump 48 is divided into a plurality of flow paths which consists of a primary flow path which bypasses the Pitot tube 52 and which may be used to provide propulsion for the collecting unit and a secondary flow which is culled out by the Pitot tube 52 and deposited in a collecting tank 56 where the oil and water are separated. Because the flow past the axial flow pump is nonemulsified, the gravity separation can be effected extremely rapidly, usually in the order of about 1 to 2 minutes. In addition, the effective diameter of Pitot tube 52 may be instantaneously changed by control of valve means 54 to open or close concentric diameter tubes 64, 66 and 68 as desired. Separation of the secondary flow by extractor tube means may also be accomplished in two steps by using a second variable speed axial flow pump 48 downstream from the first Pitot tube 52 and a second Pitot tube positioned at the discharge end of the second Pitot tUbe as shown schematically in FIG. 4.

Conduit 88 in FIG. 4 may be used with or without a variable speed pump 90 and controlled by valve 86 to return the water which settles to the bottom of the collecting tank 56 to the oil-free primary flow as an adjunct propulsion for the collecting unit. The position of the discharge tube or propulsion tube 58 is controlled through 360° of rotation by means of the hydraulic cylinder 146 interconnected to the pivot point for the propulsion tube 58 and pivoting about point 142.

By way of a specific example, and without limiting the invention, an 8 inch diameter intake unit was found to handle comfortably 2,500 to 3,000 gallons per minute of an oil-water mixture. The unit including a hydraulic drive motor weighted less than 200 pounds. The secondary flow of oil rich mixture removed by Pitot tube 52 is typically 10 percent of the input flow. Therefore, only a small storage-settling facility is all that is required because the bulk of the flow is discharged immediately and thereby creates a thrust force providing propulsion.

In addition to oil slicks or the like, the method and apparatus of the present invention may be practiced on industrial waste or any other fluids which may be isolated and separated by virtue of their difference in densities. Thus kerosene, diesel fuel, crude oil, 90 weight gear oil, 140 weight gear oil; and motor oil additives that turn into jellylike masses have been separated from water in accordance with this invention. Two useful and interesting characteristics of the system were observed. Near the end of a given test run, the oil layer was very thin and the oil-water mixture to the pump was very lean. By reducing the vacuum in the collecting tank the secondary flow was reduced and the oil-water concentration discharged into the collecting tank was kept approximately constant. In all cases the oil and water in the settling flask separated very quickly. There was no tendency of the materials to become emulsified. After 1 to 2 minutes of settling, water drawn from the bottom of the collecting tank contained no visible particles of oil.

It is thought that the invention and many of its attendant advantages will be understood from the foregoing description, and it will be apparent that various changes may be made in the form, construction and arrangement of the part without departing from the spirit and scope of the invention, the forms hereinbefore describing merely preferred embodiments thereof.

What I claim is:

1. A method of separating fluids having different densities consisting of water and at least one fluid lighter than water comprising the steps of:
   a. locally containing the fluid to be separated at the surface of a body of water substantially adjacent a collecting unit,
   b. passing the fluids to be separated over a weir means on said collecting unit,
   c. pumping the fluids which pass said weir means through an axial flow pump having an axial flow impeller,
   d. and positioning a Pitot tube behind said impeller to separate said fluids into primary and secondary flows with said secondary flow constituting primarily at least one fluid lighter than water,
   e. said secondary flow being substantially nonemulsified whereby said fluid lighter than water will separate by gravity from any water contained in said secondary flow within about 1 to 2 minutes.

2. A method of separating fluids having different densities as defined in claim 1, including the additional steps of
   a. passing said fluids through a sight tube in which said Pitot is contained,
   b. and visually positioning said Pitot tube so as to be substantially axially aligned with said fluid lighter than water.

3. A method of separating fluids having different densities as defined in claim 2 including the additional step of changing the diameter of said Pitot tube in accordance with the flow diameter of said fluid lighter than water.

4. A method of separating fluids having different densities as defined in claim 1 including the step of varying the speed of rotation of said axial flow pump to maintain the quantity of said fluid lighter than water substantially constant in said secondary flow.

5. A method of separating fluids having different densities as defined in claim 1 including the additional step of utilizing said primary flow to provide propulsion means for said collecting unit.

6. A method of separating fluids having different densities as defined in claim 5 including the additional step of periodically withdrawing water that has settled from said fluid lighter than water and returning it to said primary flow in providing propulsion means for said collecting unit.

7. A method of separating at least two fluids having different densities comprising the steps of
   a. passing said fluids through an axial flow pump,
   b. positioning an extractor tube in the path of said fluids as they leave said axial flow pump whereby said fluids are separated into primary and secondary flows,
   c. said secondary flow passing through said extractor tube and consisting primarily of the fluid having the lighter density,
   d. and separating by gravity said lighter density fluid from any heavier density fluid contained in said secondary flow,
   e. said secondary flow being substantially nonemulsified whereby said gravity separation may be effected within about 1 to 2 minutes.

8. A method of separating at least two fluids having different densities as defined in claim 7 including the additional steps of
   a. passing said fluids through a sight tube in which said extraction tube is contained,
   b. and visually positioning said extraction tube so as to be substantially axially aligned with said fluid lighter than water.

9. A method of separating at least two fluids having different densities as defined in claim 7, including the additional step of changing the diameter of said extraction tube in accordance with the flow diameter of said fluid lighter than water.

10. A method of separating at least two fluids having different densities as defined in claim 7 including the additional step of varying the speed of rotation of said axial flow pump to maintain the quantity of said fluid lighter than water substantially constant in said secondary flow.

11. A method of separating at least two fluids having different densities as defined in claim 7 wherein said method is practiced on a marine collecting vessel and said method further comprises the step of utilizing said primary flow to provide propulsion means for said marine collecting vessel.

12. A method of separating at least two fluids having different densities as defined in claim 11 including the additional step of periodically withdrawing water that has settled from said fluid lighter than water and returning it to said primary flow in providing propulsion means for said marine collecting vessel.

13. An apparatus for separating fluids having at least one heavy density fluid and one light density fluid comprising
 a. a floating collection unit,
 b. a floating boom means attached to said collection unit and locally containing the fluids to be separated at the surface of a body of water,
 c. weir means carried by said collection unit in position to receive the fluids contained by said boom means,
 d. an axial flow pump having an axial flow impeller means,
 e. conduit means interconnecting said weir means and said axial flow pump,
 f. means for dividing the discharge of said axial flow pump into a plurality of flow paths including a primary flow and a secondary flow,
 g. said dividing means including Pitot tube means for receiving said secondary flow,
 h. said secondary flow being substantially nonemulsified and being constituted primarily be said lighter density fluid,
 i. and settling tank means into which said secondary flow is deposited and wherein said lighter density fluid is separated from any of said heavy density fluid in about 1 to 2 minutes.

14. An apparatus for separating fluids having at least one heavy density fluid and one light density fluid as defined in claim 13 wherein said Pitot tube means is provided with means to change the effective diameter thereof.

15. An apparatus for separating fluids having at least one heavy density fluid and one light density fluid as defined in claim 13, wherein said weir means is vertically adjustable with respect to said collection unit.

16. An apparatus for separating fluids having at least one heavy density fluid and one light density fluid as defined in claim 13 including sightglass means positioned downstream from the discharge end of said axial flow pump which permits visual positioning of said Pitot tube means with respect to the discharge of said axial flow pump.

17. An apparatus for separating fluids having at least one heavy density fluid and one light density fluid as defined in claim 13 wherein said primary flow provides propulsion for said collection unit.

18. An apparatus for separating fluids having at least one heavy density fluid and one light density fluid as defined in claim 17 including means to return said heavy density fluid which is separated from said secondary flow to said primary flow.

19. An apparatus for separating fluids having at least one heavy density fluid and one light density fluid as defined in claim 13 including a second stage division means comprising a. a second axial flow pump positioned downstream from said Pitot tube means,
 b. and a second Pitot tube means positioned downstream from said second axial flow pump.

20. An apparatus for separating fluids having at least one heavy density fluid and one light density fluid comprising
 a. a floating collection unit,
 b. an axial flow pump carried by said collection unit,
 c. means for delivering said fluids to be separated to said axial flow pump,
 d. means for dividing the discharge of said axial flow pump into a plurality of flow paths including a primary flow and a secondary flow,
 e. said dividing means including Pitot tube means for receiving said secondary flow,
 f. said secondary flow being substantially nonemulsified and being constituted primarily by said lighter density fluid,
 g. and settling tank means into which said secondary flow is deposited and wherein said lighter density fluid is separated from any of said heavy density fluid in about 1 to 2 minutes.

21. An apparatus for separating fluids having at least one heavy density fluid and one light density fluid as defined in claim 20 wherein said Pitot tube means is provided with means to change the effective diameter thereof.

22. An apparatus for separating fluids having at least one heavy density fluid and one light density fluid as defined in claim 20 wherein said means for delivering said fluids to be separated to said axial flow pump includes weir means which is vertically adjustable with respect to said collection unit.

23. An apparatus for separating fluids having at least one heavy density fluid and one light density fluid as defined in claim 20 including sightglass means positioned downstream from the discharge end of said axial flow pump which permits visual positioning of said Pitot tube means with respect to the discharge of said axial flow pump.

24. An apparatus for separating fluids having at least one heavy density fluid and one light density fluid as defined in claim 20 wherein said primary flow provides propulsion for said collection unit.

25. An apparatus for separating fluids having at least one heavy density fluid and one light density fluid as defined in claim 24 including means to return said heavy density fluid which is separated from said secondary flow to said primary flow.

26. An apparatus for separating fluids having at least one heavy density fluid and one light density fluid as defined in claim 20 including a second-stage division means comprising
 a. a second axial flow pump positioned downstream from said Pitot tube means,
 b. and a second Pitot tube means positioned downstream from said second axial flow pump.

27. An apparatus for separating fluids having at least one heavy density fluid and one light density fluid as defined in claim 20 wherein said axial flow pump is provided with an axial flow impeller, and said axial flow impeller is supported by ceramic alumina thrust and rotary bearings.

28. An apparatus for separating fluids having at least one heavy density fluid and one light density fluid as defined in claim 20 including converging conduit means between the discharge of said axial flow pump and said Pitot tube means.

29. An apparatus for separating fluids having at least one heavy density fluid and one light density fluid as defined in claim 20 including diverging conduit means between the discharge of said axial flow pump and said Pitot tube means.

30. A method of separating at least two fluids having different densities as defined in claim 7, including the additional step of varying said secondary flow in accordance with a vacuum pressure in a collecting tank into which said secondary flow is drawn.